UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

PROCESS OF DEVELOPING AZO COLORS.

SPECIFICATION forming part of Letters Patent No. 588,203, dated August 17, 1897.

Application filed April 27, 1897. Serial No. 634,137. (No specimens.)

*To all whom it may concern:*

Be it known that I, ARTHUR WEINBERG, a citizen of Prussia, and a resident of Frankfort-on-the-Main, Germany, have invented new and useful Improvements in Producing Fast Dyeings, of which the following is a specification.

According to this invention those direct-dyeing cotton dyestuffs which contain free amido groups are combined with diazo bodies upon the fiber, forming new combinations. The dyeings thus developed with suitable diazo bodies become absolutely fast to milling. Generally a considerable increase of the intensity is connected with the developing process. The process appears to be an inversion of the well-known method of diazotizing amidized direct-dyeing coloring-matters upon the fiber. In the latter process, for instance, the diamin black is transformed into its diazo compound and is afterward combined with so-called "developers," such as beta-naphthol, forming polyazo bodies of the type

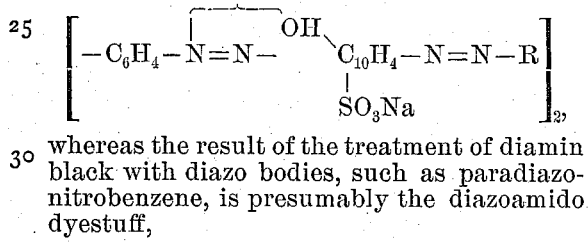

whereas the result of the treatment of diamin black with diazo bodies, such as paradiazonitrobenzene, is presumably the diazoamido dyestuff,

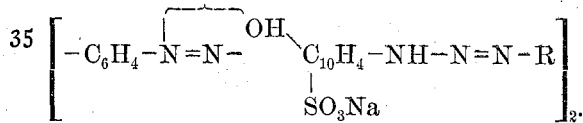

In both cases the diamin violet,

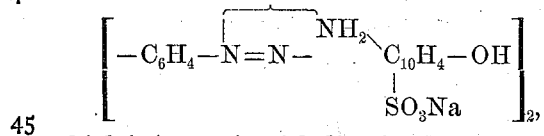

which is isomeric with diamin black, does not react on account of the absence of a free amido group.

In some cases the formation of primary diazo dyestuffs takes place simultaneously with the formation of the diazoamido body, but in all cases it becomes evident that the taking up of the diazo compound into the nucleus is only of secondary importance, for if the corresponding primary diazo compounds which are substituted in the nucleus are previously prepared it is found that they are neither fast to milling nor insoluble, and they can only be fixed upon the fiber with diazo bodies if they still contain a free amido group. A very important group of such direct-dyeing dyestuffs are those which derive from metaphenylenediamin and analogous bodies. If, for instance, dyeings produced with the dyestuffs known under the denominations of "cotton brown" or "benzo brown" are treated with diazo bodies, they become perfectly fixed, simultaneously gaining considerably in intensity. The complicated polyazo dyestuffs—such as, for instance, diamin jet-black and oxydiamin black, which are also derivatives of metaphenylenediamin—behave in a similar manner. Tests have demonstrated that among the diazo bodies those which react energetically—such as diazonitrobenzenes, diazoazobenzene, the diazo compound of dehydrothiotoluidin, and the like—are most suitable. Diazosulfonic or diazocarbonic acids are of course not well adapted for the purposes of the present process. Generally speaking, the simple monodiazo bodies yield better results than tetrazo bodies.

The process consists in dyeing the coloring-matters in alkaline or saline baths in the usual manner and in immediately afterward entering the goods into the bath containing the diazo body. The latter may be either alkaline or acidulated with acetic or mineral acids. The capability of most of the diazo bodies to react easily in mineral-acid solutions under the conditions of the present process—*i. e.*, in presence of the fiber—is very striking and of great technical value, for it is well known that the diazo bodies are very stable in acid solutions, while, for instance, diazo solutions saturated with acetate of soda remain fit for use only at low temperatures and for a relatively short time. When the reaction is terminated, which generally takes place very quickly, the goods are wrung off, washed out, and, if the diazotizing bath has been acid, are preferably slightly soaped. The process can also be applied for the production of various print effects.

The following table contains some of the principal shades which may be produced in the manner described:

| Name of the dyestuff. | Developed with the diazo combination of— | | | |
|---|---|---|---|---|
| | Paranitranilin. | Mononitranilin. | Amidoazo-benzole. | Dehydrothio-toluidin. |
| Diamin black R | Reddish black | Violet-black | Black | Reddish black. |
| Diamin black B | Black | Blackish blue | Black | Black. |
| Diamin black BH | Blue-black | Blue-black | Black | Blue-black. |
| Diamin blue 3B | Bluish green | Bluish green | Blackish green | Greenish blue. |
| Diamin blue-black E | Black | Blackish blue | Black | Blackish blue. |
| Oxamin violet | Blackish violet | Violet-brown | Brownish violet | Blackish violet. |
| Diamin brown M | Dark brown | Dark brown | Dark brown | Brown. |
| Diamin brown V | Dark brown | Violet-brown | Violet-brown | Dark brown. |
| Diamin brown B | Dark brown | Brown | Dark brown | Brown. |
| Diamin cutch | Violet-black | Brownish violet | Brownish violet | Brownish violet. |
| Diazo blue | Violet-brown | Brown | Violet-brown | Brown. |
| Diamin jet-black SS | Blackish brown | Blackish brown | Blackish brown | Blackish brown. |
| Diamin jet-black RB | Dark brown | Blackish brown | Blackish brown | Dark brown. |
| Diamin jet-black Cr | Dark brown | Blackish brown | Blackish brown | Dark brown. |
| Diamin jet-black OO | Dark brown | Blackish brown | Blackish brown | Dark brown. |
| Columbia black R | Blackish brown | Blackish brown | Blackish brown | Blackish brown. |
| Columbia black BB | Brownish black | Brownish black | Brownish black | Black. |
| Direct blue-black | Blackish brown | Blackish brown | Blackish brown | Blackish brown. |
| Diazo brilliant black | Dark brown | Brown | Dark brown | Brown. |
| Benzo chrome-black | Blue-black | Jet-black | Black | Black. |
| Oxydiamin black SOOO | Brownish black | Brownish black | Brownish black | Brownish black. |
| Oxydiamin black N | Brownish black | Black | Black | Brownish black. |
| Diaminogene | Greenish black | Black | Jet-black | Black. |
| Cotton brown N | Dark brown | Brown | Brown | Brown. |
| Benzo brown | Dark brown | Brown | Yellowish brown | Brown. |
| Toluylene brown G | Dark brown | Yellowish brown | Dark brown | Dark brown. |
| Toluylene orange | Chestnut brown | Brown | Yellowish brown | Brown. |
| Primulin | Yellow | Greenish yellow | Reddish yellow | Golden yellow. |

The foregoing list of combinations does not nearly exhaust the sphere of the invention. The respective dyeings are all fast to milling and most of them also fast to acids. They do not rub off and resist very well most of the reagents used in the dyeing and printing industries.

Having now particularly described and ascertained the nature of my invention and in what manner the same can be performed, what I claim as new, and desire to secure by Letters Patent, is—

The process of developing dyeings produced by means of those direct-dyeing cotton dyestuffs which contain free primary amido groups by treating the goods in a bath containing diazo compounds substantially as described.

In testimony that I claim the foregoing as my invention I have signed my name, in presence of two witnesses, this 10th day of April, 1897.

ARTHUR WEINBERG.

Witnesses:
JEAN GRUND,
FRANK H. MASON.

It is hereby certified that in Letters Patent No. 588,203, granted August 17, 1897, upon the application of Arthur Weinberg, of Frankfort-on-the Main, Germany, for an improvement in "Processes of Developing Azo Colors," an error appears in the printed specification requiring correction, as follows: Page 2, heading of third column, the word "mononitranilin" should read *metanitranilin;* and that the said Letters Patent should be read with this correction therein that the same may conform to the record of the case in the Patent Office.

Signed, countersigned, and sealed this 5th day of October, A. D. 1897.

[SEAL.]

WEBSTER DAVIS,
*Assistant Secretary of the Interior.*

Countersigned:
    BENJ. BUTTERWORTH,
        *Commissioner of Patents.*